(12) United States Patent
Lin et al.

(10) Patent No.: US 6,320,291 B1
(45) Date of Patent: *Nov. 20, 2001

(54) CONSTRUCTION OF MOTOR

(75) Inventors: Kuo-Cheng Lin; Yu-Hung Huang; Wen-Shi Huang, all of Taoyan (TW)

(73) Assignee: Delta Electronics, Inc. (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/376,483

(22) Filed: Aug. 18, 1999

(51) Int. Cl.$^7$ ................................. H02K 5/00; H02K 5/12
(52) U.S. Cl. ........................ 310/91; 310/67 R; 310/89; 360/99.08; 360/99.04; 360/98.07
(58) Field of Search .................................. 310/67 R, 91, 310/89, 40 MM, 42, 62, 63, 254; 29/596–598; 360/99.08, 99.04, 98.07

(56) References Cited

U.S. PATENT DOCUMENTS

| | | | |
|---|---|---|---|
| 4,682,065 | * 7/1987 | English et al. | 310/90 |
| 4,934,041 | * 6/1990 | Hoover et al. | 29/596 |
| 5,343,104 | 8/1994 | Takahashi et al. | 310/67 R |
| 5,492,458 | * 2/1996 | Horng | 417/423.7 |
| 5,663,604 | * 9/1997 | Takahashi | 310/91 |
| 5,959,383 | * 9/1999 | Winzen et al. | 310/67 R |
| 5,982,066 | * 11/1999 | Marracino et al. | 310/91 |
| 6,000,919 | * 12/1999 | Hsieh | 417/423.15 |

* cited by examiner

Primary Examiner—Tran Nguyen

(57) ABSTRACT

A motor structure includes a base, at least one bearing, a shaft, a hollow coil assembly, and an elastic ring. The base has at least two fan-shaped sheets and a lower projection. The bearing is received between the fan-shaped sheets. The shaft is supported by the bearing for rotation and is formed with a circumferential groove. The hollow coil assembly for surrounding the fan-shaped sheets includes a plurality of snap engaging portions for engaging with the lower projection and includes an upper projection for pressing against the bearing. The elastic ring is engaged with the circumferential groove for fixing the bearing in cooperation with the lower projection and the upper projection.

1 Claim, 4 Drawing Sheets

CONSTRUCTION OF MOTOR

FIELD OF THE INVENTION

The present invention relates to an improved motor structure.

BACKGROUND OF THE INVENTION

A motor is an important part in a fan. As systems to be cooled become thinner and thinner, the thickness of a fan for use in of systems has to be reduced. Consequently, the thickness such the motor in the fan has to be reduced too.

A bearing is an important member in a motor structure. It can be understood to those skilled in the art that the bearing has to be secured to its position by pre-loading so that it can operate in a good condition. There are some ways for pre-loading a bearing. For example, as shown in FIG. 2 of U.S. Pat. No. 5,343,104, the bearing is secured to its position by means of a projected portion 9 of a bearing race 8 and a thrust plate 33. The thrust plate 33 is secured by a stopper 34 that is attached onto the end portion of the shaft 14 against the thrust plate 33 by means of press fitting. Moreover, as shown in FIG. 8 of the patent, the bearing race 8 has to be secured to a stator 17 by a U-shaped groove, a plurality of projections 31, and tapered faces 25. This involves quite a few members and a complex structure. Therefore, it is hard to reduce the fan thickness in the case of adopting the fan motor in accordance with this prior art United State patent.

The structure of a conventional fan motor on the market is described in the following for explaining another way of securing the bearing.

A conventional fan motor structure as shown in FIG. 1 includes a base 101, a bearing seat 102, bearings 103 and 104, a shaft 105, an impeller 108, a coil assembly 106, a printed circuit board 107, a spring 109, and a C-ring 110. The bearing seat 102 locates in a central portion of the base 101 and has a projection 102a. The bearings 103 and 104 are inserted from below and from above respectively into the bearing seat 102 and separated by the projection 102a. The shaft 105 is formed with a circumferential groove 105a. The impeller 108 is fixed on the shaft 105 for rotation therewith and has a hub 108a and a plurality of blades 108b. The coil assembly 106 includes a silicon steel set 106a, an insulation portion 106b, a coil 106c, and a snap engaging portion 106d. The printed circuit board 107 is fixed on the base 101 and in snap engagement with the snap engaging portion 106d.

As shown in FIG. 1, the spring 109 is provided at an upper end of the bearing 104 and the C-ring 110 is provided at the lower end of a bearing 103 for securing the bearings 103 and 104. The two ends of the spring 109 contact the bearing 104 and the hub 108a respectively. The spring 109 and the projection 102a cooperatively secure the bearing 104. On the other hand, the C-ring 110 is engaged with the circumferential groove 105a formed on the shaft 105. The elastic force provided by the spring 109 and the cooperation between the C-ring 110 and the projection 102a can secure and pre-load the bearing 103.

The disadvantages of the above-mentioned fan motor is described in the following with reference to FIG. 1. The bearing seat 102 is secured to the base 101 and the coil assembly 106 can be fixed to an outer surface of the bearing seat 102 by glue. The function of positioning the bearings 103 and 104 is cooperatively provided by the bearing seat 102, spring 109, and C-ring 110. Due to that the bearing seat 102 and the bearings 103 and 104 are substantially rigid, the vibration generated when the motor operates cannot be effectively absorbed in the case that there is a clearance between any of the bearings (103 and 104) and the bearing seat 102 (especially in the case of clearance fitting). Moreover, due to that the bearing seat 102 must contact the bearings 103 and 104, the base 101, and the coil assembly 106 at the same time, each of these members must be assigned a strict size and tolerance. This makes a complex assembly process.

Furthermore, the primary function of the spring 109 and the C-ring 110 is to provide securing forces to the bearings 103 and 104. If a single member can provide the same function, not only the related manufacturing and assembly processes can be simplified but also it becomes possible to produce a super-thin motor.

SUMMARY OF THE INVENTION

It is therefore an object of the present invention to provide an improved motor structure that can provide the functions of absorbing vibrations and noises caused by assembly clearances and of pre-loading and fixing the bearing(s) therein by means of less elements, can be used to produce a thin fan, and can facilitate the assembly process.

In the motor structure, the elastic ring for elastically securing the at least one bearing is an o-ring or a helical spring.

BRIEF DESCRIPTION OF THE DRAWINGS

The above and other objects and the features and effects of the present invention can be best understood by referring to the following detailed description of the preferred embodiment and the accompanying drawings, wherein.

DETAILED DESCRIPTION OF THE PREFERRED EMBODIMENTS

Figure 1:
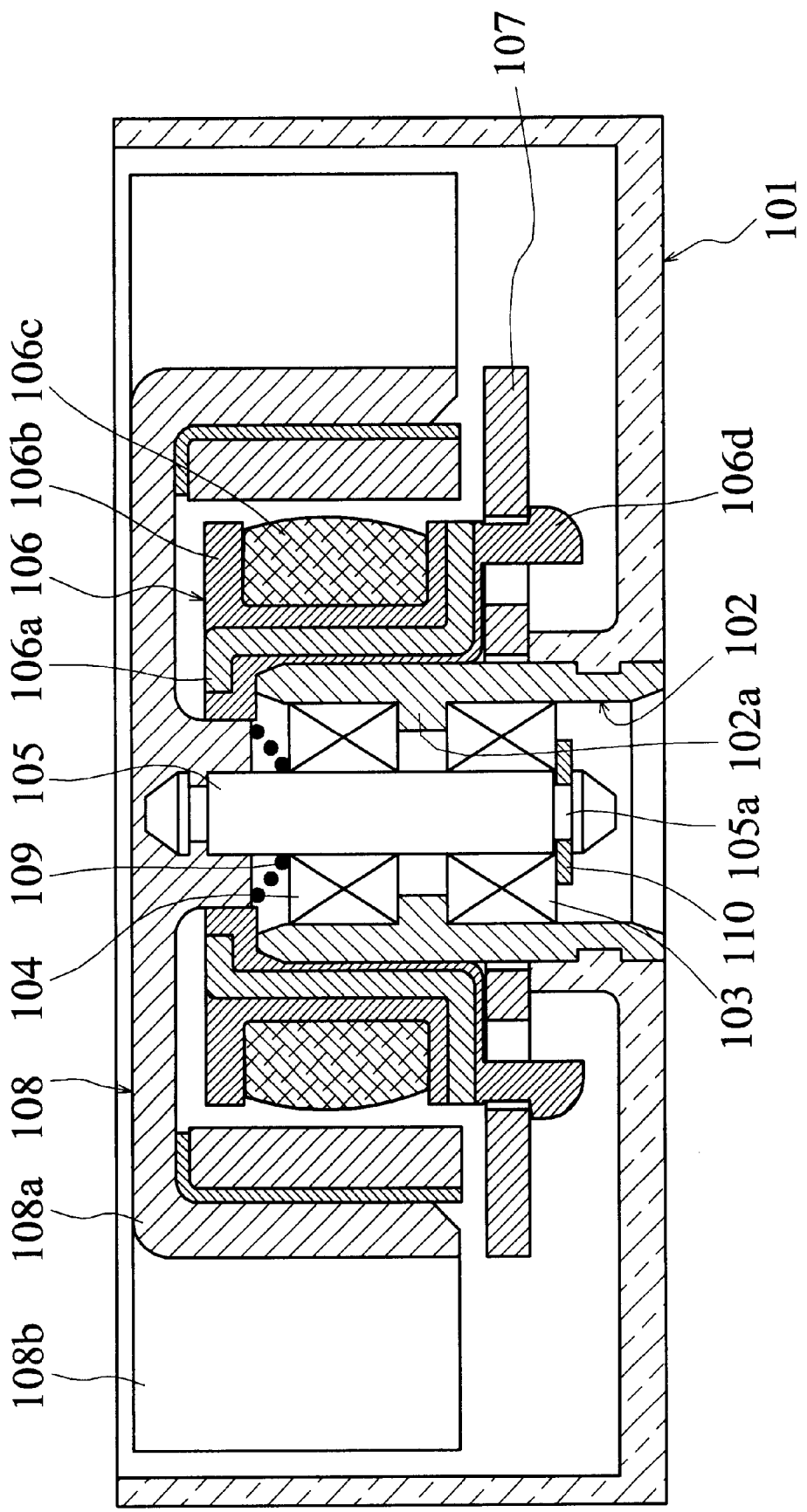
FIG. 1 is a sectional view of a conventional fan motor structure.
Figure 2:
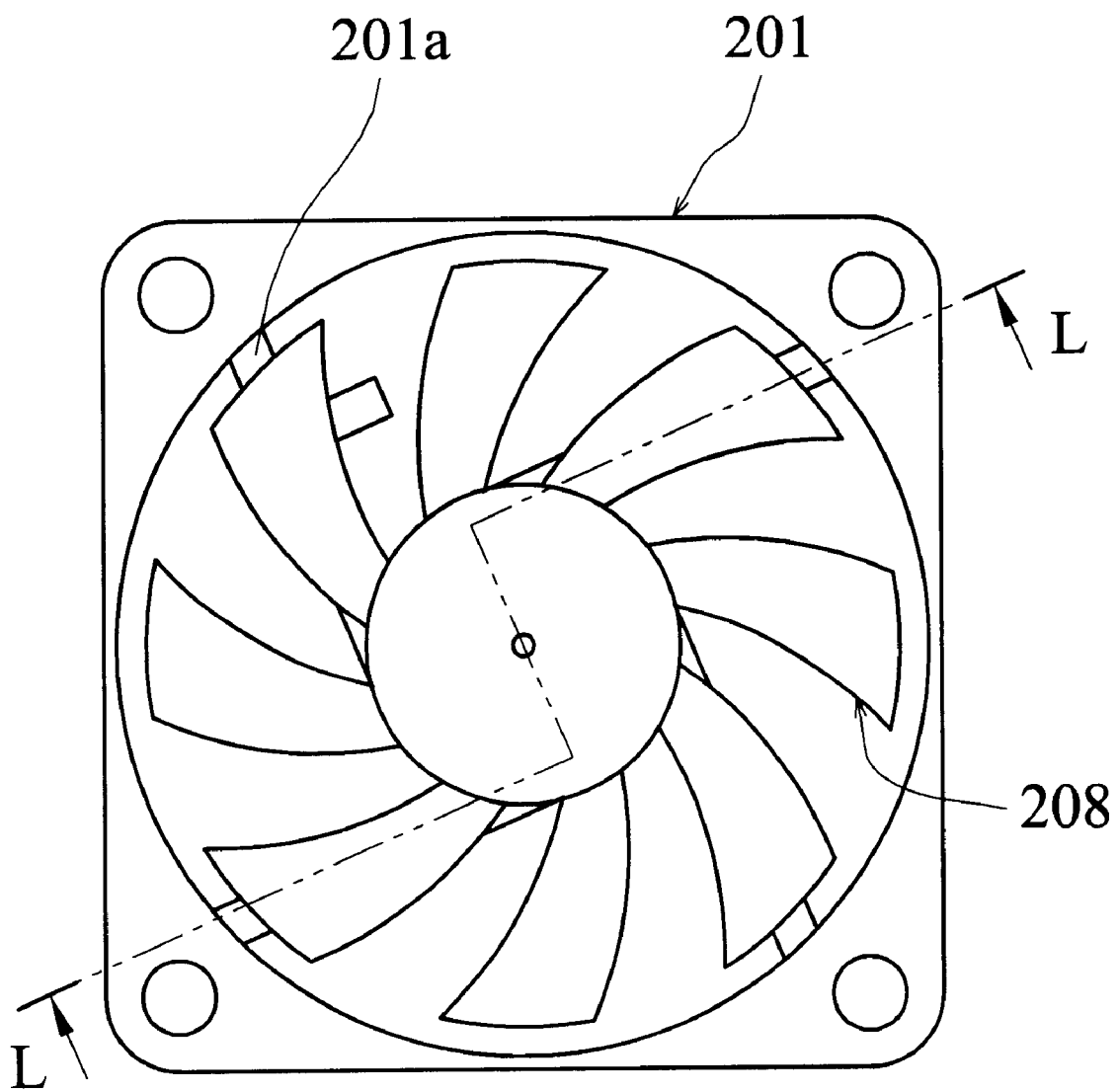
FIG. 2 is a top view of a fan motor structure in accordance with a preferred embodiment of the invention.
Figure 3:
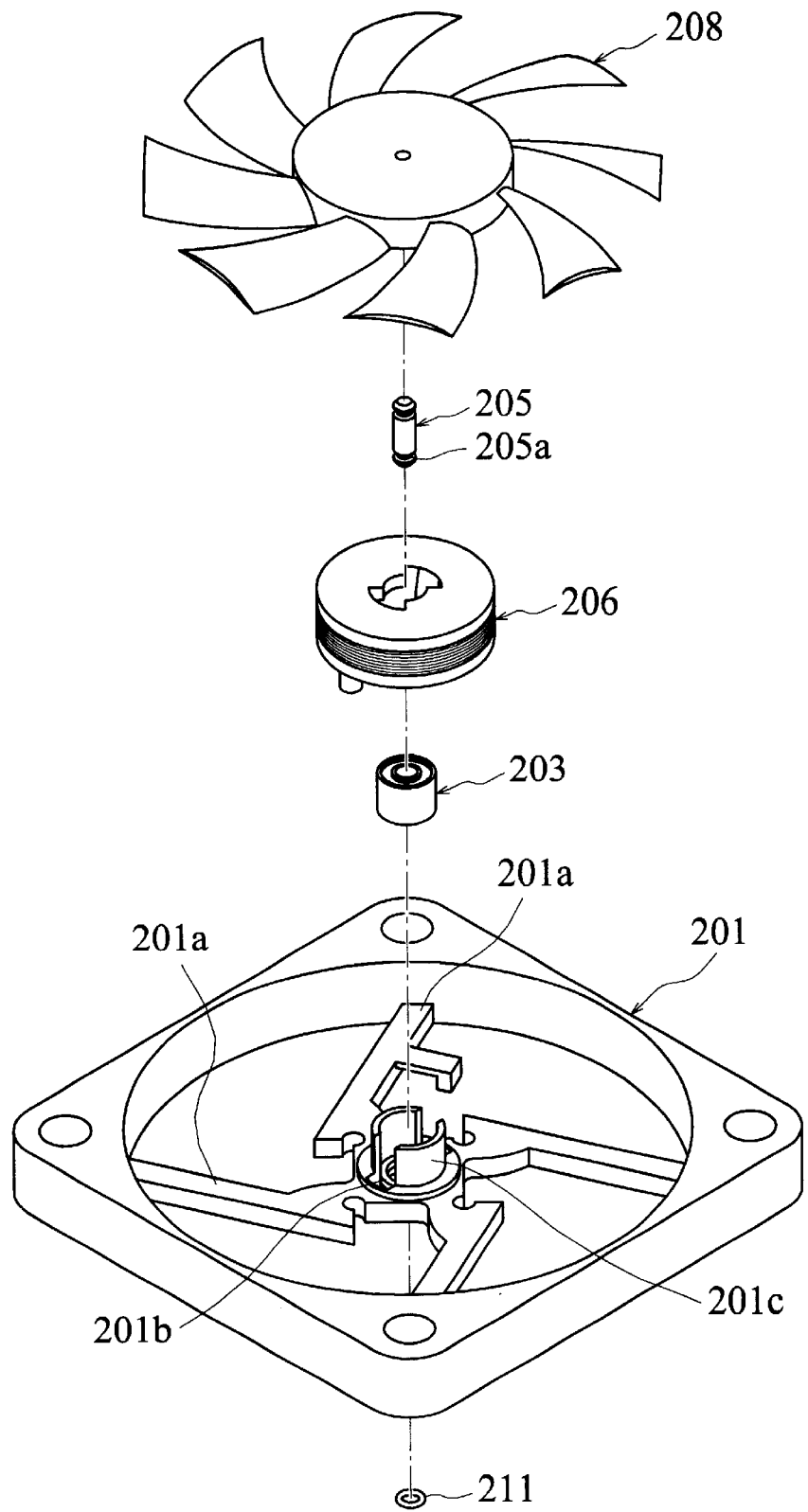
FIG. 3 is an exploded view of the fan motor structure shown in FIG. 2.
Figure 4:
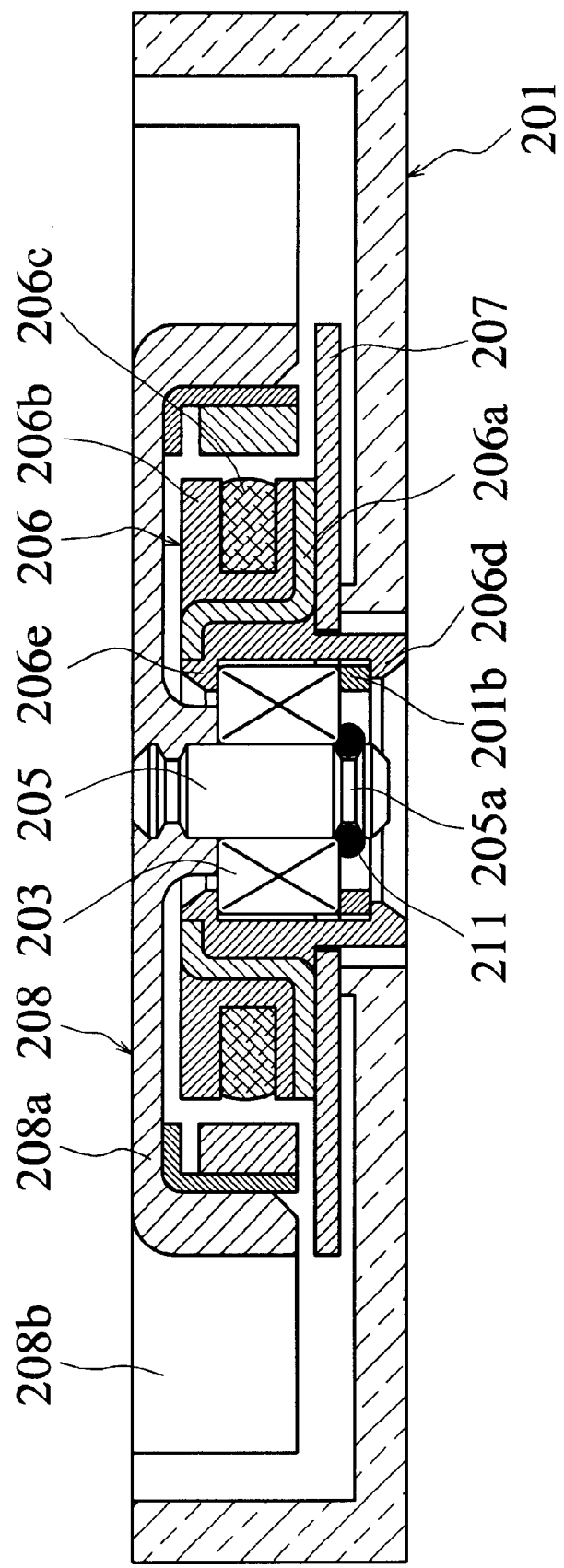
FIG. 4 is a sectional view taken along the line L—L of FIG. 2.

Referring to FIG. 3, a fan motor structure in accordance with a preferred embodiment of the invention includes: a base 201; a bearing 203, a hollow coil assembly 206, a shaft 205 formed with a circumferential groove 205a, an impeller 208, and an O-ring 211. The base 201 is provided with 4 ribs 201a, a lower projection 201b, and two fan-shaped sheets 201c. Referring also to FIG. 4, the coil assembly 206 includes a silicon steel set 206a, an insulation portion 206b, a coil 206c, a snap engaging portion 206d, and an upper projection 206e. The impeller 208 includes a hub 208a and a plurality of blades 208b.

It is to be noted that: 1) The two openings between the two fan-shaped sheets 201c provides the room for the snap engaging portion 206d to engage with the lower projection 201b; 2) Due to that the line L—L passes through the two openings, the two fan-shaped sheets 201c are not shown in FIG. 4.

As to the assembly of the fan motor structure, referring to FIG. 3, the bearing 201 is first inserted between the two fan-shaped sheets 201c in the base 201. The two fan-shaped sheets 201c are telescoped by the coil assembly 206 and the snap engaging portion 206d is engaged with the lower projection 201b. The shaft 205 is then engaged with the impeller 208 before it is inserted through the central hole of the bearing 203. Finally, the O-ring 211 is engaged with the circumferential groove 205a of the shaft 205 to complete the assembly process.

The way to secure the bearing 203 is described in the following. Referring to FIG. 4, after the bearing 203 is surrounded by the coil assembly 206, the lower projection 201b supports the bearing 203 (i.e. an upward force is exerted on the bearing 203 by the lower projection 201b). After the two fan-shaped sheets 201c are telescoped by the coil assembly 206, the upper projection 206e exerts a downward force on the bearing 203. Thereby, the bearing 203 is secured in its axial direction. The bearing 203 is secured in its radial direction by the two fan-shaped sheets 201c.

Referring to FIG. 3, due to that the two fan-shaped sheets 201c can be elastically deformed in the radial direction of the bearing 203, they can elastically secure the bearing 203 when the bearing 203 is surrounded by the coil assembly 206. More specifically, when the bearing 203 is positioned between two fan-shaped sheets 201c, if the outer radial dimension of the bearing 203 is slightly greater than the inner radial dimension provided by the two fan-shaped sheets 201c, the two fan-shaped sheets 201c can be deformed outward to facilitate the positioning of the bearing 203 and can properly secure the bearing 203. In another aspect, when the two fan-shaped sheets 201c are telescoped by the coil assembly 206, the inward deformation tendency of the two fan-shaped sheets 201c can effectively absorb the clearances between the members of the fan motor structure.

To better secure the bearing 203, the inner radial dimension provided by the two fan-shaped sheets 201c is slightly smaller than outer dimension of the bearing 203 and the outer radial dimension of the two fan-shaped sheets 201c is slightly greater than the inner radial dimension of the coil assembly 206 in which the two fan-shaped sheets 201c are telescoped. Therefore, in the ideal case, no any clearances appear in the assembly process and no vibrations occur due to the clearances.

However, in the actual case, the clearances occur in the assembly process cause the motor to generate vibrations and most of the vibrations can be absorbed by the O-ring 211. Therefore, one of the functions of the O-ring is to absorb the vibrations caused by the clearances occur in the assembly process so that the fan motor can operate smoothly.

Although a preferred embodiment of the invention has been illustrated and described, it will be obvious to those skilled in the art that various modifications may be made without departing from the scope and spirit of the invention defined by the appended claims. For example, three or more fan-shaped sheets 201c, instead of two fan-shaped sheets as in the first embodiment, can be used. For another example, the invention is not limited to using a single bearing. In the case of using two bearings, the lower projection 201b are formed on the side wall of the two fan-shaped sheets 201c and the snap engaging portion 206d is engaged with the base 201. For yet another example, an elastic ring (e.g., a helical spring) instead of an O-ring can be used for securing the bearing and absorbing the vibrations.

What is claimed is:

1. A motor construction comprising:

a base having at least two fan-shaped sheets and a lower projection;

at least one bearing received between said at least two fan-shaped sheets;

a shaft supported by said at least one bearing for rotation and formed with a circumferential groove;

a hollow coil assembly surrounding said at least two fan-shaped sheets, including a plurality of snap engaging portions for engaging with said lower projection and having an upper projection for pressing against said at least one bearing; and an elastic ring engaged with said circumferential groove for fixing said at least one bearing in cooperation with said lower projection and said upper projection, wherein said at least two fan-shaped sheets are elastically deformed in the radial direction of said at least one bearing for elastically securing said at least one bearing when said hollow coil assembly surrounding said at least two fan-shaped sheets.

* * * * *

UNITED STATES PATENT AND TRADEMARK OFFICE
CERTIFICATE OF CORRECTION

PATENT NO. : 6,320,291 B1
DATED : November 20, 2001
INVENTOR(S) : Lin et al.

It is certified that error appears in the above-identified patent and that said Letters Patent is hereby corrected as shown below:

Title page,
Item [54], insert Title, -- MOTOR STRUCTURE --

Signed and Sealed this

Second Day of July, 2002

Attest:

Attesting Officer

JAMES E. ROGAN
*Director of the United States Patent and Trademark Office*